United States Patent
Chikugo et al.

(10) Patent No.: US 11,953,807 B2
(45) Date of Patent: Apr. 9, 2024

(54) DETECTION DEVICE, MECHANICAL DEVICE, AND WORK VEHICLE

(71) Applicant: Komatsu Ltd., Tokyo (JP)

(72) Inventors: Hiroyuki Chikugo, Tokyo (JP); Shuuji Hori, Tokyo (JP); Haruna Higashi, Tokyo (JP)

(73) Assignee: Komatsu Ltd., Tokyo (JP)

( * ) Notice: Subject to any disclaimer, the term of this patent is extended or adjusted under 35 U.S.C. 154(b) by 373 days.

(21) Appl. No.: 17/420,840

(22) PCT Filed: Feb. 26, 2020

(86) PCT No.: PCT/JP2020/007875
§ 371 (c)(1),
(2) Date: Jul. 6, 2021

(87) PCT Pub. No.: WO2020/184189
PCT Pub. Date: Sep. 17, 2020

(65) Prior Publication Data
US 2022/0091485 A1   Mar. 24, 2022

(30) Foreign Application Priority Data

Mar. 14, 2019   (JP) .................................. 2019-047300

(51) Int. Cl.
G03B 17/56    (2021.01)
G01N 21/88    (2006.01)
H01F 7/02     (2006.01)

(52) U.S. Cl.
CPC ........... *G03B 17/561* (2013.01); *G01N 21/88* (2013.01); *H01F 7/02* (2013.01)

(58) Field of Classification Search
CPC .... G01N 21/954; G01N 21/88; G03B 17/561; H01F 7/02
See application file for complete search history.

(56) References Cited

U.S. PATENT DOCUMENTS

| | | |
|---|---|---|
| 10,655,514 B2 | 5/2020 | Hori et al. |
| 10,767,748 B2 | 9/2020 | Chikugo et al. |
| 2006/0280499 A1* | 12/2006 | Lee ........................ H04N 23/52 348/E5.025 |

FOREIGN PATENT DOCUMENTS

| | | |
|---|---|---|
| JP | S58-34042 U | 3/1983 |
| JP | H10-19788 A | 1/1998 |
| JP | 2000-246138 A | 9/2000 |
| JP | 2005-337945 A | 12/2005 |
| JP | 2011-252458 A | 12/2011 |
| JP | 2015-048710 A | 3/2015 |
| JP | 2015-184096 A | 10/2015 |
| WO | 2017/073734 A1 | 5/2017 |
| WO | 2017/208373 A1 | 12/2017 |
| WO | 2019/002651 A1 | 1/2019 |

* cited by examiner

*Primary Examiner* — Christopher E Mahoney
(74) *Attorney, Agent, or Firm* — Locke Lord LLP

(57) ABSTRACT

A detection device includes a photographing unit, a first holding portion holding the photographing unit, a magnet having an attracting face facing a flow space in which fluid flows and opposed to the photographing unit via the flow space, a second holding portion holding the magnet, and a connection portion connected to the second holding portion and having an opening portion.

10 Claims, 7 Drawing Sheets

DETECTION DEVICE, MECHANICAL DEVICE, AND WORK VEHICLE

FIELD

The present invention relates to a detection device, a mechanical device, and a work vehicle.

BACKGROUND

There is known a technique of estimating the deterioration state of a mechanical part by photographing the internal space of a housing accommodating the mechanical part. Patent Literature 1 discloses a technique of photographing the internal space of a housing via a spacer member in which a magnet is embedded. Foreign objects generated from the mechanical part are attracted to the end face of the spacer member by the magnetic force of the magnet. A photographing device photographs, via the spacer member, the foreign objects attracted to the end face of the spacer member. Based on the analysis result of the image data photographed by the photographing device, the deterioration state of the mechanical part is estimated.

CITATION LIST

Patent Literature

Patent Literature 1: WO 2017/208373 A

SUMMARY

Technical Problem

If the volume of a magnet embedded in a spacer member is large, the proportion of the magnet in the end face of the spacer member becomes large. As a result, the range of the end face of the spacer member at which foreign objects can be photographed by a photographing device becomes small. On the other hand, if the volume of the magnet embedded in the spacer member is small, the amount of foreign objects that can be attracted by the magnet is small.

An aspect of the present invention is to acquire appropriate image data for estimating the deterioration state of a mechanical part.

Solution to Problem

According to an aspect of the present invention, a detection device comprises: a photographing unit; a first holding portion holding the photographing unit; a magnet having an attracting face facing a flow space in which fluid flows, the attracting face opposed to the photographing unit via the flow space; a second holding portion holding the magnet; and a connection portion connected to the second holding portion and having an opening portion.

Advantageous Effects of Invention

According to an aspect of the present invention, it is possible to acquire appropriate image data for estimating the deterioration state of a mechanical part.

DESCRIPTION OF EMBODIMENTS

Hereinafter, embodiments of the present invention are described with reference to the drawings, but the present invention is not limited thereto. The constituent elements of the embodiments described below can be appropriately combined. In addition, some constituent elements cannot be used.

First Embodiment

Figure 1:
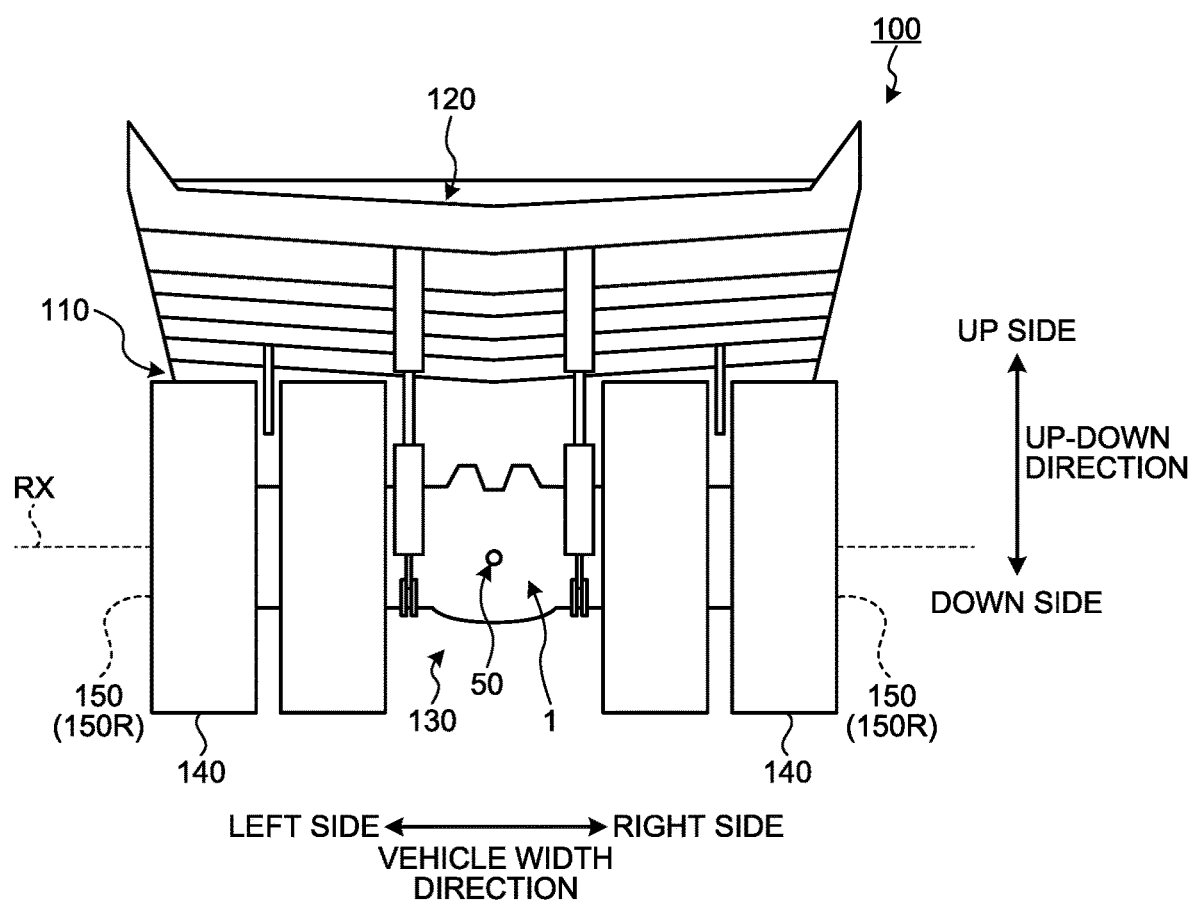
FIG. 1 is a rear-side perspective view of an example of a work vehicle according to a first embodiment.

A first embodiment is described. FIG. 1 is a rear-side perspective view of an example of a work vehicle 100 according to the present embodiment. In the present embodiment, the work vehicle 100 is a dump truck that carries a load and travels at a mining site of a mine. In the following description, the work vehicle 100 is appropriately referred to as a dump truck 100.

<Dump Truck>

As illustrated in FIG. 1, the dump truck 100 includes a vehicle-body frame 110, a dump body 120 supported by the vehicle-body frame 110, and a traveling device 130 that supports the vehicle-body frame 110 and travels.

The traveling device 130 has wheels 150 on each of which a tire 140 is mounted. The wheels 150 include a front wheel and a rear wheel 150R. The rear wheel 150R rotates around a rotation axis RX.

In the following description, the extension direction of the rotation axis RX is appropriately referred to as a vehicle width direction, the traveling direction of the dump truck 100 is appropriately referred to as a front-rear direction, and the direction orthogonal to the vehicle width direction and the front-rear direction is appropriately referred to as an up-down direction.

One side in the front-rear direction is the front side, and the direction opposite to the front side is the rear side. One side in the vehicle width direction is the right side, and the direction opposite to the right side is the left side. One side in the up-down direction is the up side, and the direction opposite to the up side is the down side.

The vehicle-body frame 110 has an engine that is a drive source. In the present embodiment, the engine includes an internal combustion engine such as a diesel engine. The dump body 120 is a member on which a load is loaded.

The traveling device 130 has an axle device 1 that transmits the driving force generated by the engine to the rear wheel 150R. The driving force generated by the engine is transmitted to the drive shaft via a transmission device. The axle device 1 is coupled to the drive shaft. The axle device 1 transmits the driving force of the engine supplied via the transmission device and the drive shaft to the rear wheel 150R. The rear wheel 150R rotates around the rotation axis RX by the supplied driving force. Accordingly, the traveling device 130 travels.

<Axle Device>

Figure 2:
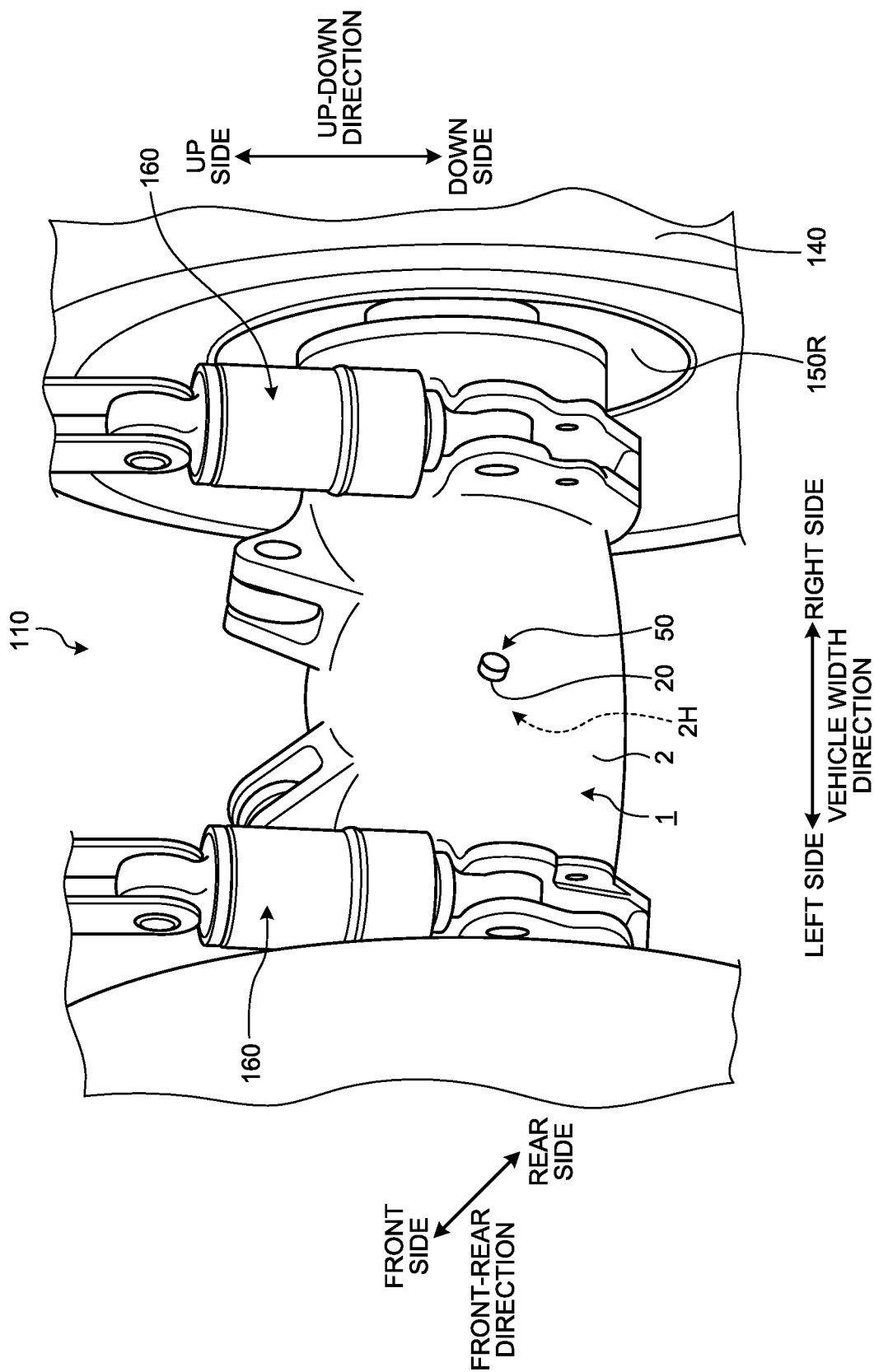
FIG. 2 is a rear-side view of a part of a mechanical device according to the first embodiment.

FIG. 2 is a rear-side view of a part of the axle device 1 according to the present embodiment. In the present embodiment, the axle device 1 is a rear axle that drives the rear wheel 150R. The axle device 1 is a mechanical device including an axle housing 2 and a mechanical part accommodated in an internal space 2H of the axle housing 2. The axle housing 2 is supported by the vehicle-body frame 110 via a suspension device 160. The axle housing 2 has an opening 20 in which a detection device 50 is arranged. The opening 20 is provided at the rear portion of the axle housing 2 and at the center portion in the vehicle width direction.

As the mechanical part accommodated in the axle housing 2, a plurality of gears, such as a bevel gear and a pinion gear of the axle device 1, is exemplified. The internal space 2H accommodates oil, which is a fluid for lubricating or cooling the mechanical part. About half of the mechanical part is oil-immersed in the internal space 2H.

<Detection Device>

Figure 3:
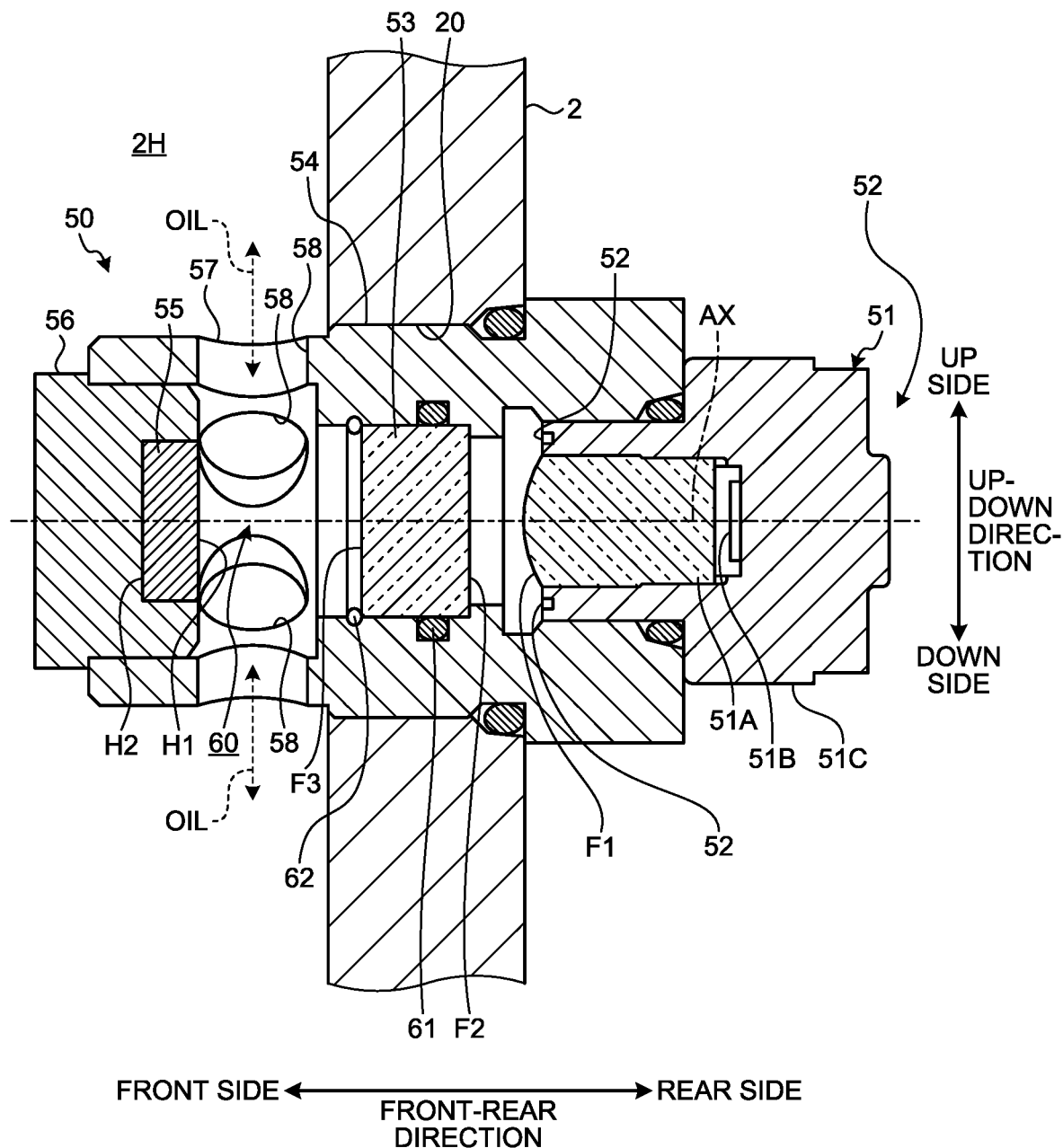
FIG. 3 is a cross-sectional view illustrating an example of a detection device according to the first embodiment.

FIG. 3 is a cross-sectional view illustrating an example of the detection device 50 according to the present embodiment. The detection device 50 is arranged in the opening 20 of the axle housing 2. The detection device 50 photographs the internal space 2H of the axle housing 2 accommodating the mechanical part and acquires image data to be used to estimate the deterioration state of the mechanical part.

The detection device 50 includes a photographing unit 51, an illumination unit 52, a spacer portion 53, a first holding portion 54, a magnet 55, a second holding portion 56, and a connection portion 57.

The photographing unit 51 photographs the internal space 2H to acquire image data. The photographing unit 51 includes a digital camera. The photographing unit 51 includes an optical system 51A, an imaging device 51B, such as a charge coupled device (CCD) image sensor or a complementary metal oxide semiconductor (CMOS) image sensor, and a camera housing 51C accommodating the optical system 51A and the imaging device 51B.

The illumination unit 52 illuminates the photographing area of the photographing unit 51. The illumination unit 52 is arranged around a front end face F1 of the optical system 51A. The illumination unit 52 includes a light source that emits illumination light. The light source is embedded in a front end face of the camera housing 51C. As the light source, a light emitting diode (LED) is exemplified.

The spacer portion 53 separates the photographing unit 51 from the oil. The spacer portion 53 is substantially cylindrical. The spacer portion 53 has a lens-side end face F2 opposed to the front end face F1 of the optical system 51A and a magnet-side end face F3 facing the opposite side of the lens-side end face F2. The magnet-side end face F3 of the spacer portion 53 faces a flow space 60 in which oil, which is fluid, flows. The lens-side end face F2 and the magnet-side end face F3 are parallel to each other. The front end face F1 and the lens-side end face F2 are opposed to each other via a gap. Note that, the front end face F1 and the lens-side end face F2 may be in contact with each other. The spacer portion 53 is a transparent member capable of transmitting visible light. In the present embodiment, the spacer portion 53 contains polycarbonate resin. The polycarbonate resin is transparent and has high heat resistance.

The first holding portion 54 holds the photographing unit 51, the illumination unit 52, the spacer portion 53, and the second holding portion 56. The first holding portion 54 is substantially tubular. The first holding portion 54 is arranged around the photographing unit 51, the illumination unit 52, the spacer portion 53, and the second holding portion 56. The first holding portion 54 is arranged in the opening 20 of the axle housing 2. Between the outer peripheral surface of the spacer portion 53 and the inner peripheral surface of the first holding portion 54, a sealing member 61 like an O-ring is arranged. Around the magnet-side end face F3 of the spacer portion 53, a fixing ring 62 is arranged to fix the spacer portion 53.

The photographing unit 51 is held by the first holding portion 54 in such a manner that the optical axis AX of the optical system 51A extends in the front-rear direction. The spacer portion 53 is held by the first holding portion 54 in such a manner that the optical axis AX is orthogonal to each of the lens-side end face F2 and the magnet-side end face F3.

The second holding portion 56 holds the magnet 55. The magnet 55 is held by the second holding portion 56 in such a manner as to be opposed to the spacer portion 53 via the flow space 60. The spacer portion 53 is arranged between the photographing unit 51 and the magnet 55. The magnet 55 is held by the second holding portion 56 in such a manner as to be opposed to the photographing unit 51 via the flow space 60 and the spacer portion 53.

The magnet 55 is, for example, a neodymium magnet. The magnet 55 collects foreign objects of magnetic material in the internal space 2H. The magnet 55 is substantially cylindrical. The magnet 55 has an attracting face H1 facing the flow space 60 in which oil flows and a rear face H2 facing the opposite side of the attracting face H1. The attracting face H1 and the rear face H2 are parallel to each other. The attracting face H1 of the magnet 55 is in contact with the oil flowing in the flow space 60. The second holding portion 56 has a support face opposed to the rear face H2 of the magnet 55 and the side face of the magnet 55. The attracting face H1 of the magnet 55 is opposed to the photographing unit 51 via the flow space 60. The magnet-side end face F3 of the spacer portion 53 is opposed to the attracting face H1 of the magnet 55 via the flow space 60.

The magnet 55 is held by the second holding portion 56 in such a manner that the optical axis AX and the attracting face H1 are orthogonal to each other. The magnet 55 is held by the second holding portion 56 in such a manner that the optical axis AX and the center of the attracting face H1 of the magnet 55 are aligned with each other in the plane orthogonal to the optical axis AX.

The connection portion 57 is connected to the second holding portion 56. In the present embodiment, the connection portion 57 is included in the first holding portion 54. That is, the first holding portion 54 and the connection portion 57 are integrated. Note that, the first holding portion 54 and the connection portion 57 may be separate bodies. If the first holding portion 54 and the connection portion 57 are separate bodies, the connection portion 57 connects the first holding portion 54 and the second holding portion 56. The connection portion 57 has an opening portion 58 connected to the flow space 60 between the attracting face H1 of the magnet 55 and the magnet-side end face F3 of the spacer portion 53. The external space of the flow space 60 is the internal space 2H of the axle housing 2. About half of the internal space 2H is filled with oil. The flow space 60 is included in the internal space 2H. The oil in the internal space 2H can flow into the flow space 60 through the opening portion 58. The oil in the flow space 60 can flow out to the internal space 2H through the opening portion 58.

The attracting face H1 of the magnet 55 is photographed by the photographing unit 51 via the flow space 60. The photographing unit 51 photographs the attracting face H1 of the magnet 55 via the spacer portion 53 and the flow space 60. The photographing unit 51 is capable of acquiring image data of the flow space 60 including the magnet 55. When the magnet 55 is photographed, the flow space 60 including the magnet 55 is illuminated by the illumination unit 52. The illumination light emitted from the illumination unit 52 is applied to the magnet 55 via the spacer portion 53 and the flow space 60.

The attracting face H1 of the magnet 55 is smaller than the field of vision of the optical system 51A. In the plane orthogonal to the optical axis AX, the optical axis AX and the center of the attracting face H1 are aligned with each other. The attracting face H1 is arranged at the center of the field of vision of an optical system 51H.

<Image Data>

Figure 4:
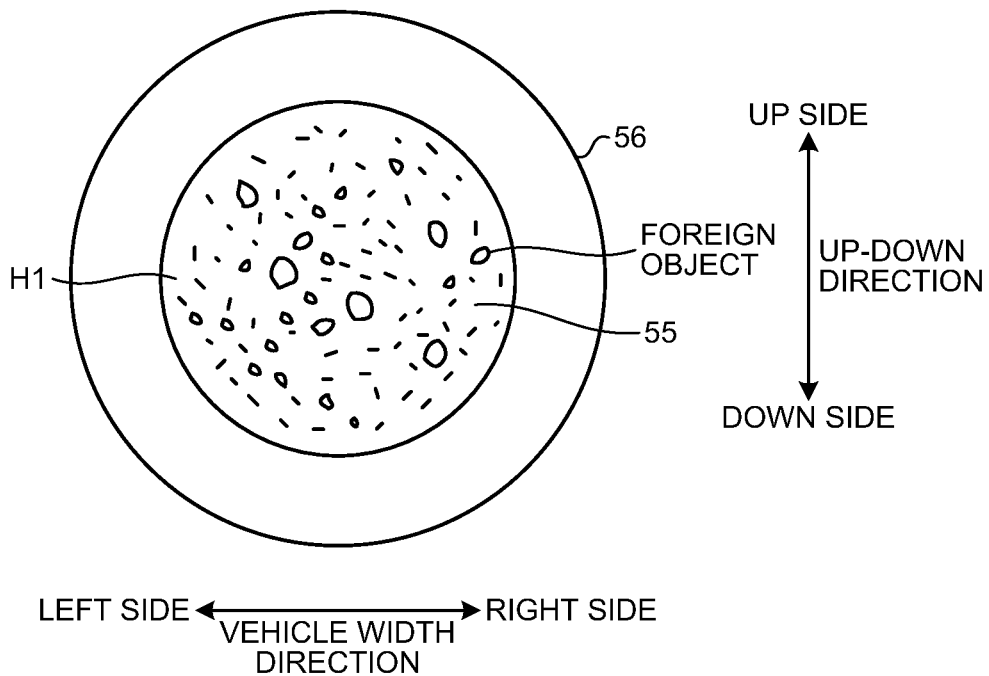
FIG. 4 is a schematic diagram illustrating an example of image data acquired by the detection device according to the first embodiment.

FIG. 4 is a schematic diagram illustrating an example of image data acquired by the detection device 50 according to the present embodiment. As foreign objects in the internal space 2H, metal powder generated from a mechanical part is exemplified. If the mechanical part is a gear, the friction of the gear can generate metal powder, such as abrasion powder or broken pieces. The mechanical part is immersed in the oil in the internal space 2H. The foreign objects generated from the mechanical part mix with the oil in the internal space 2H.

The oil in the internal space 2H flows into the flow space 60 through the opening portion 58. The oil that has flowed into the flow space 60 comes into contact with the attracting face H1 of the magnet 55. The attracting face H1 is flat and circular. If the foreign objects mixed in the oil are magnetic material, the foreign objects are attracted to the attracting face H1 by the magnetic force of the magnet 55. The foreign objects are collected by the magnetic force of the magnet 55. FIG. 4 illustrates an example in which various foreign objects of different sizes and shapes are collected by the magnet 55. By collecting the foreign objects mixed in the oil by the magnetic force of the magnet 55, the foreign objects generated from the mechanical part are prevented from entering, for example, the meshing parts of a plurality of gears and the sliding surface of a bearing arranged in the internal space 2H. This prevents uneven abrasion and breakage of the mechanical part and deterioration of the mechanical part of the axle device 1.

The photographing unit 51 photographs the attracting face H1 of the magnet 55 via the flow space 60. The magnet 55 is arranged in the field of vision of the optical system 51A of the photographing unit 51. The photographing unit 51 can photograph the foreign objects attracted to the attracting face H1 of the magnet 55.

The image data acquired by the detection device 50 is image-processed. After the image data is image-processed, the foreign objects collected by the magnet 55 are analyzed. For example, the amount of the foreign objects collected on the attracting face H1 is calculated. Alternatively, the sizes of the foreign objects collected on the attracting face H1 are calculated. Based on the analysis result of the foreign objects, the deterioration state of the mechanical part accommodated in the internal space 2H of the axle housing 2 is estimated.

For example, if the amount of the foreign objects collected on the attracting face H1 is large, it is estimated that a large amount of foreign objects is generated from the mechanical part and that the deterioration of the mechanical part has progressed. If the amount of foreign object collected on the attracting face H1 is small, it is estimated that the amount of foreign objects generated from the mechanical part is small and that the deterioration of the mechanical part has not yet progressed.

If the sizes of the foreign objects collected on the attracting face H1 are large, it is estimated that the mechanical part comes to the end of its life. In addition, it is estimated that uneven abrasion of the mechanical part has occurred based on the sizes of the foreign objects collected on the attracting face H1.

If the mechanical part of the axle device 1 is determined to come to the end of its life, the axle device 1 is overhauled before the mechanical part of the axle device 1 reaches the end of its life.

<Effects>

As described above, by arranging the magnet 55 in the internal space 2H, although foreign objects are generated from the mechanical part provided in the internal space 2H, the foreign objects are collected by the magnet 55 by the magnetic force of the magnet 55. By collecting the foreign objects, it is possible to prevent the foreign objects from adhering to the mechanical part. Accordingly, the deterioration of the mechanical part is prevented.

The attracting face H1 of the magnet 55 faces the flow space 60 in which the oil flows. The attracting face H1 is opposed to the photographing unit 51 via the flow space 60. The photographing unit 51 photographs the attracting face H1 via the flow space 60. The photographing unit 51 can photograph the entire area of the attracting face H1 on which the foreign objects are attracted. By increasing the volume of the magnet 55, the amount of foreign objects that can be attracted by the magnet 55 can be increased. The detection device 50 can acquire appropriate image data of the foreign objects generated from the mechanical part.

In addition, by increasing the volume of the magnet 55, the amount of foreign objects that can be attracted by the magnet 55 can be increased, and frequent maintenance work for removing the foreign objects from the magnet 55 does not need to be performed.

By providing the spacer portion 53, the photographing unit 51 and the oil are separated from each other, and the oil is prevented from being in contact with the photographing unit 51. Accordingly, the deterioration of the photographing unit 51 is prevented. In addition, the photographing unit 51 can be easily replaced. In addition, the photographing unit 51 can be regularly attached to perform photographing without being permanently installed.

In the plane orthogonal to the optical axis AX of the optical system 51A of the photographing unit 51, the optical axis AX and the center of the attracting face H1 of the magnet 55 are aligned with each other. Accordingly, the attracting face H1 is arranged at the center of the field of vision of the optical system 51A. Thus, the detection device 50 can acquire appropriate image data of the foreign objects generated from the mechanical part.

The illumination unit 52 is provided to illuminate the photographing area of the photographing unit 51. Although the internal space 2H of the axle housing 2 is dark, the illumination unit 52 illuminates the internal space 2H, and the photographing unit 51 can satisfactorily photograph the internal space 2H.

Second Embodiment

A second embodiment is described. In the following description, constituent elements that are the same as those in the above embodiment are denoted by the same reference signs, and the description thereof is simplified or omitted.

Figure 5:
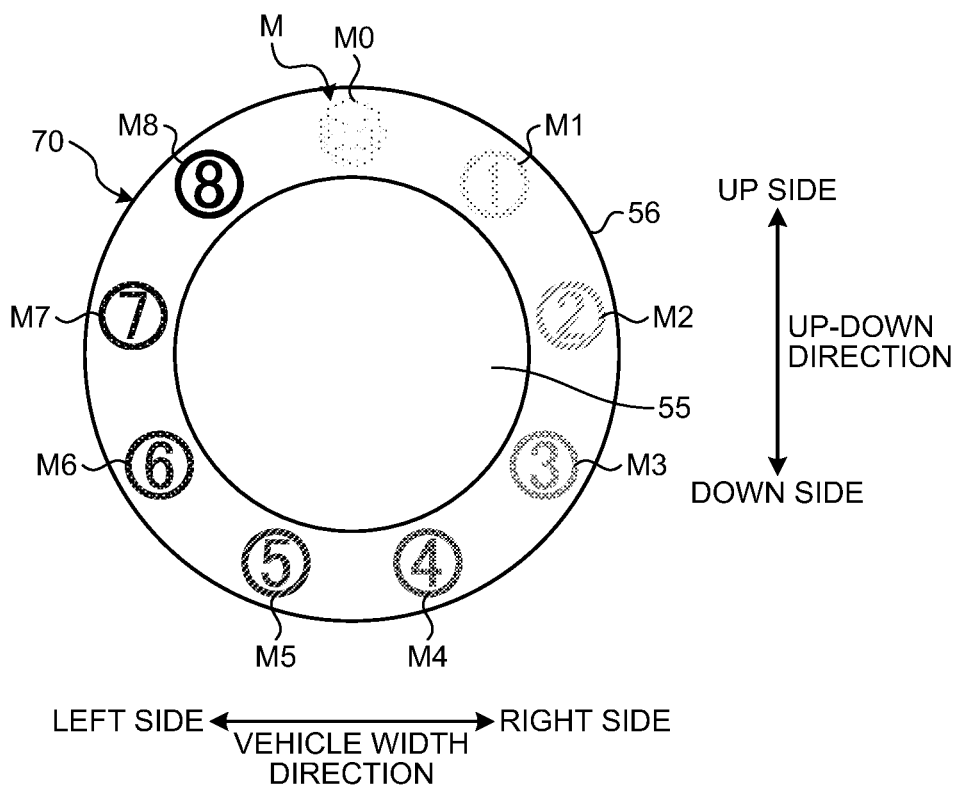
FIG. 5 is a plan view illustrating a magnet and a second holding portion according to a second embodiment.

FIG. 5 is a plan view illustrating a magnet 55 and a second holding portion 56 according to the present embodiment. As illustrated in FIG. 5, a detection device 50 includes an indicator portion 70 arranged near the magnet 55 and used to determine the state of the oil flowing through a flow space 60.

The indicator portion 70 includes an annular plate arranged around the magnet 55. The surface of the indicator portion 70 is in contact with the oil in the flow space 60. The indicator portion 70 has a plurality of marks M for determining the color tone of the oil as the state of the oil.

The surface of the indicator portion 70 is white. The marks M are drawn on the white surface (base) with an oil-resistant ink having hue different from that of white. Each of the marks M has hue that is the same as or similar to that of the oil. The hue of the marks M is, for example, brown.

In the present embodiment, nine marks M are provided on the indicator portion 70. In the present embodiment, the marks M are the numbers "0.5", "1", "2", "3", "4", "5", "6", "7", and "8", each of which is circled. In the following description, the mark M including "0.5" is appropriately referred to as a reference mark M0. The mark M including "1" is appropriately referred to as a first mark M1. The mark M including "2" is appropriately referred to as a second mark M2. The mark M including "3" is appropriately referred to as a third mark M3. The mark M including "4" is appropriately referred to as a fourth mark M4. The mark M including "5" is appropriately referred to as a fifth mark M5. The mark M including "6" is appropriately referred to as a sixth mark M6. The mark M including "7" is appropriately referred to as a seventh mark M7. The mark M including "8" is appropriately referred to as an eighth mark M8.

In the present embodiment, the marks M each include a number, but an alphabet character may be included instead of a number.

Each of the marks M has different color density. Of the marks M, the density of the reference mark M0 is the lowest, the density of the first mark M1 is low after the reference mark M0, the density of the second mark M2 is low after the first mark M1, the density of the third mark M3 is low after the second mark M2, the density of the fourth mark M4 is low after the third mark M3, the density of the fifth mark M5 is low after the fourth mark M4, the density of the sixth mark M6 is low after the fifth mark M5, the density of the seventh mark M7 is low after the sixth mark M6, and the density of the eighth mark M8 is the highest.

Note that, each of the marks M may have different brightness. For example, of the marks M, the brightness of the reference mark M0 may be the highest, the brightness of the first mark M1 may be high after the reference mark M0, the brightness of the second mark M2 may be high after the first mark M1, the brightness of the third mark M3 may be high after the second mark M2, the brightness of the fourth mark M4 may be high after the third mark M3, the brightness of the fifth mark M5 may be high after the fourth mark M4, the brightness of the sixth mark M6 may be high after the fifth mark M5, the brightness of the seventh mark M7 may be high after the sixth mark M6, and the brightness of the eighth mark M8 may be the lowest.

Note that, each of the marks M may have different saturation. For example, of the marks M, the saturation of the reference mark M0 may be the highest, the saturation of the first mark M1 may be high after the reference mark M0, the saturation of the second mark M2 may be high after the first mark M1, the saturation of the third mark M3 may be high after the second mark M2, the saturation of the fourth mark M4 may be high after the third mark M3, the saturation of the fifth mark M5 may be high after the fourth mark M4, the saturation of the sixth mark M6 may be high after the fifth mark M5, the saturation of the seventh mark M7 may be high after the sixth mark M6, and the saturation of the eighth mark M8 may be the lowest.

The marks M correspond to colors that change depending on the deterioration state of the oil. In addition, the marks M may change the criteria for each oil manufacturer.

The marks M are arranged at intervals on the surface of the indicator portion 70. Each of the marks M is arranged in the field of vision of an optical system 51A of a photographing unit 51.

The photographing unit 51 photographs the indicator portion 70 via the oil in the flow space 60. Accordingly, the image data of the indicator portion 70 including the marks M is acquired by the photographing unit 51. Based on the image data acquired by the photographing unit 51, the state of the oil accommodated in an internal space 2H is determined. In the present embodiment, it is determined whether the color tone of the oil is equal to or higher than a threshold based on the image data. The threshold for the color tone of the oil is a predetermined value. If the color tone of the oil is equal to or higher than the threshold, this means that the oil has a high color tone and that the deterioration of the oil has not progressed. If the color tone of the oil is lower than the threshold, this means that the oil becomes turbid, making the color tone of the oil lowered and that the deterioration of the oil has progressed.

When the deterioration of the oil has not progressed and the color tone of the oil is high, the photographing unit 51 can acquire the image data of the marks M although the density (brightness) of the marks M is low. When the color tone of the oil is high, the photographing unit 51 can acquire the image data of each of the first mark M1 to the eighth mark M8.

When the deterioration of the oil has progressed and the color tone of the oil is low, it is difficult for the photographing unit 51 to visually recognize the image of the marks M if the density (brightness) of the mark M is low. When the color tone of the oil is low, the photographing unit 51 can acquire the image data of the eighth mark M8 but cannot acquire the image data of the reference mark M0 to the seventh mark M7.

In this manner, the deterioration progress state of the oil correlates with the color tone of the oil, and the color tone of the oil corresponds to the mark M whose image data can be acquired. Thus, the color tone of the oil is determined based on the image data of the mark M acquired by the photographing unit 51.

As described above, according to the present embodiment, the indicator portion 70 is provided around the magnet 55. Thus, the detection device 50 can acquire both the image data of the foreign objects collected by the magnet 55 and the image data of the indicator portion 70. The deterioration state of a mechanical part is estimated based on the image data of the foreign objects collected by the magnet 55. The deterioration state of the oil is estimated based on the image data of the indicator portion 70. In this manner, it is possible to estimate both the deterioration state of the mechanical part and the deterioration state of the oil in the present embodiment.

In the example illustrated in FIG. 5, the indicator portion 70 includes an annular plate arranged around the magnet 55.

Figure 6:
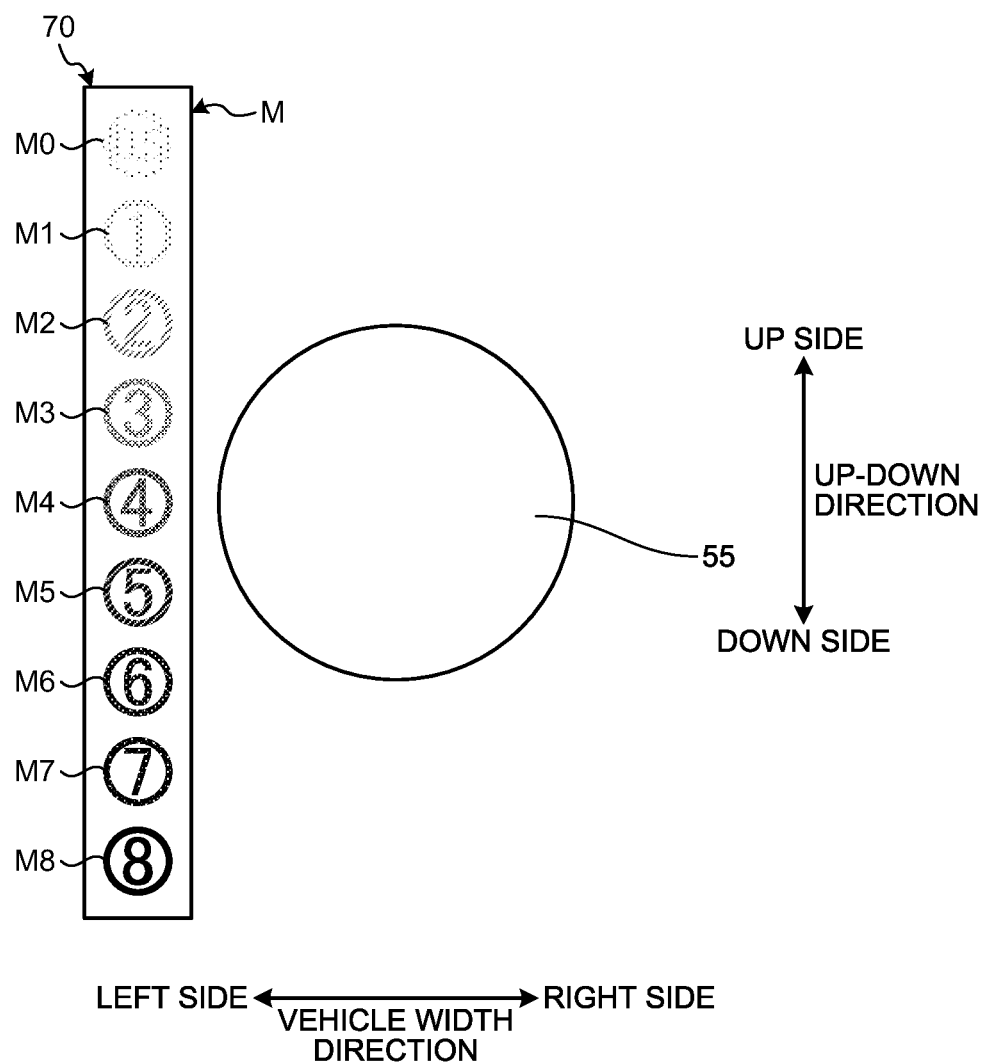
FIG. 6 is a plan view illustrating the magnet and the second holding portion according to the second embodiment.
Figure 7:
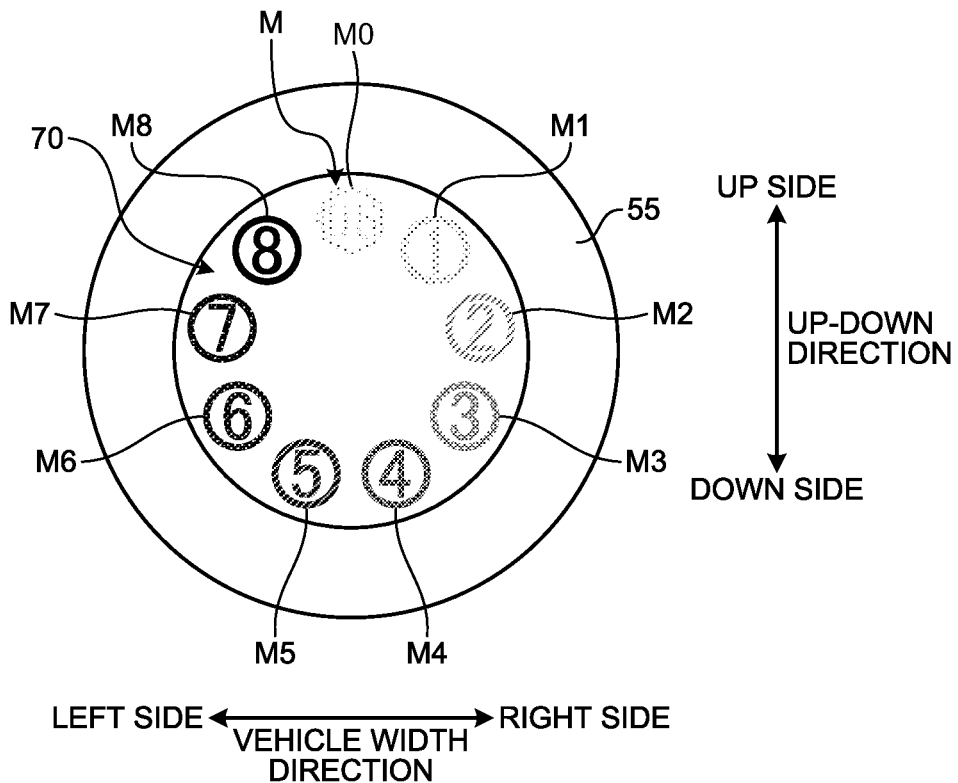
FIG. 7 is a plan view illustrating the magnet and the second holding portion according to the second embodiment.

As illustrated in FIG. 6, the indicator portion 70 may be arranged next to the magnet 55. In the example illustrated in FIG. 6, the indicator portion 70 includes a plate extending in the up-down direction next to the magnet 55. Alternatively, as illustrated in FIG. 7, the magnet 55 may be annular, and the indicator portion 70 may be arranged inside the magnet 55.

Note that, the indicator portion 70 may not have the marks M. That is, the surface of the indicator portion 70 may be plain. If the marks M are not provided on the surface of the indicator portion 70, the illumination unit 52 illuminates the indicator portion 70 with each of a plurality of colored light beams, whereby it is possible to estimate the deterioration state of the oil based on the reflected light reflected on the surface of the indicator portion 70. As the colored light beams, different colored light beams, such as a red light beam, a blue light beam, and a green light beam, are exemplified. The reflectance of each color light beam changes based on the color tone of the oil. The reflectance of each color light beam when the colored light beam is emitted via fresh oil (oil with a high color tone) is different from the reflectance of each color light beam when the colored light beam is emitted via deteriorated oil (oil with a low color tone). That is, the reflectance characteristics of the colored light beams are different depending on the color tone of the oil. Thus, by irradiating the oil with the colored light beams and calculating the reflectance characteristics of the colored light beams, it is possible to estimate the deterioration state of the oil.

Third Embodiment

A third embodiment is described. In the following description, constituent elements that are the same as those in the above embodiment are denoted by the same reference signs, and the description thereof is simplified or omitted.

Figure 8:
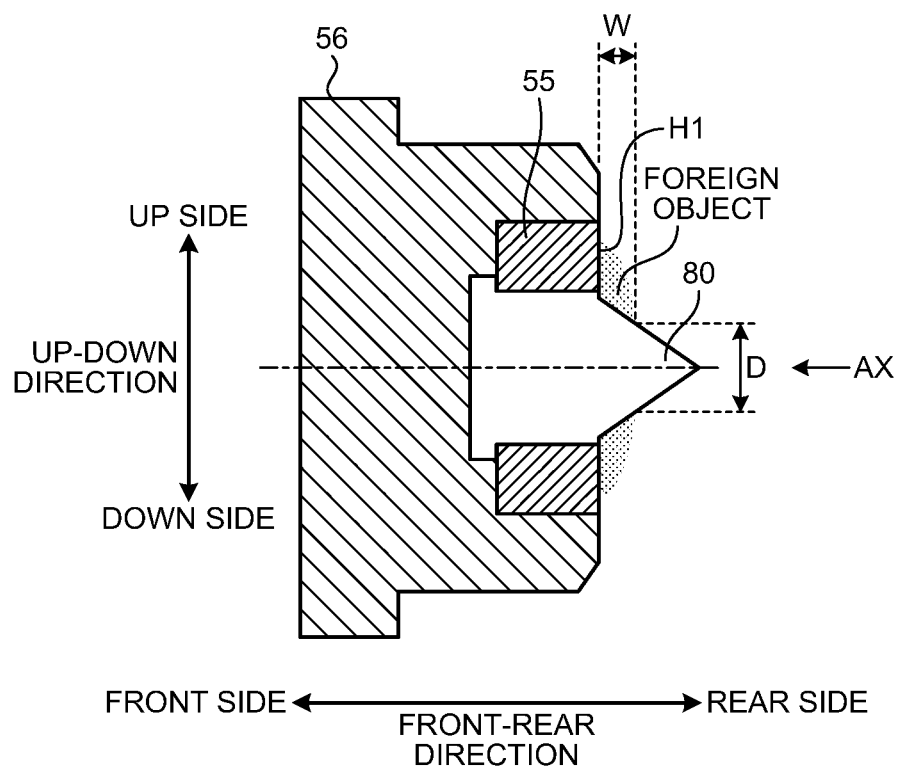
FIG. 8 is a cross-sectional view illustrating a magnet and a second holding portion according to a third embodiment.
Figure 9:
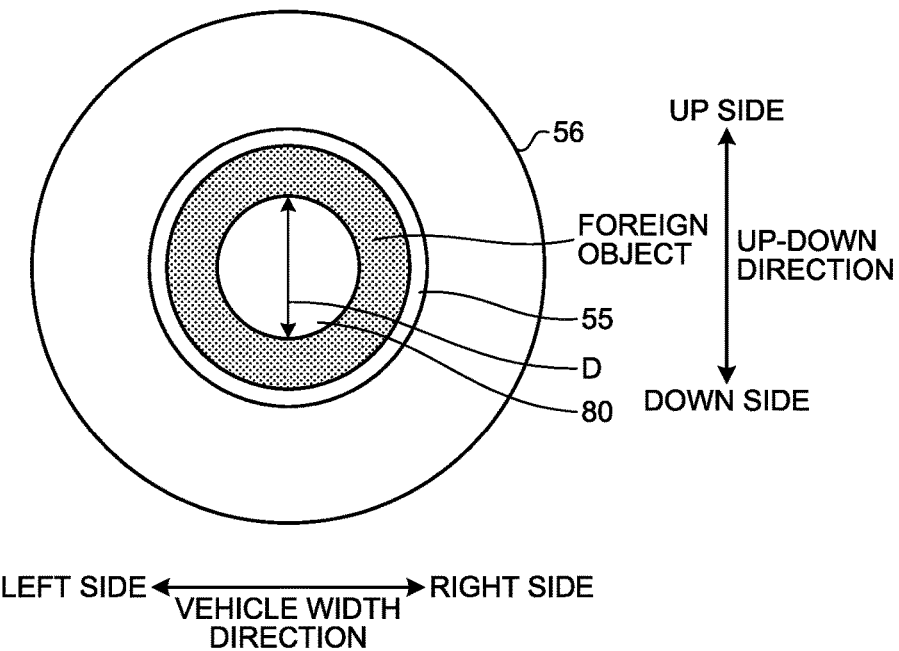
FIG. 9(A) and FIG. 9(B) are plan views illustrating the magnet and the second holding portion according to the third embodiment.
Figure 9:
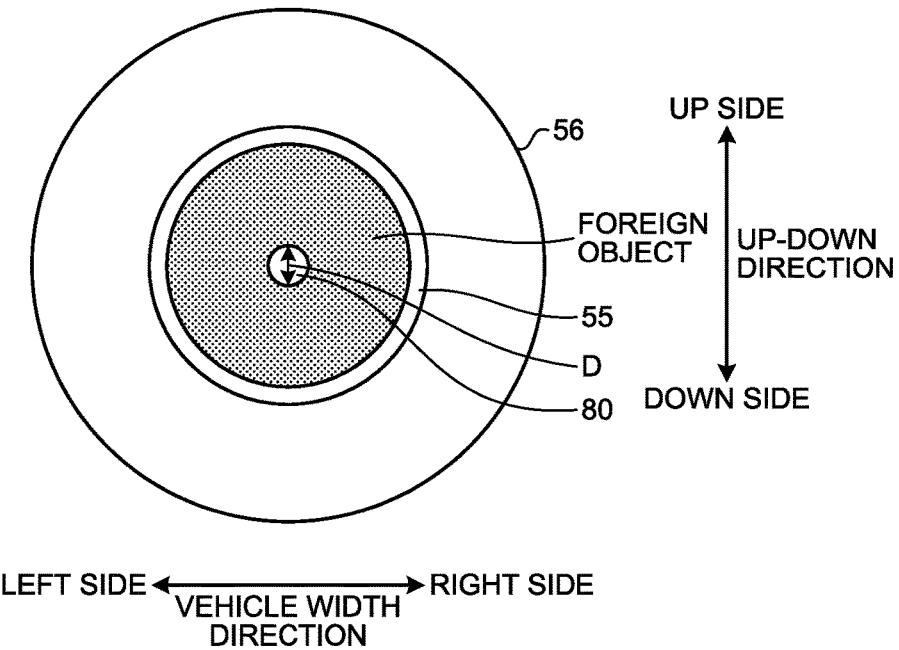

FIG. 8 is a cross-sectional view illustrating a magnet 55 and a second holding portion 56 according to the present embodiment. FIG. 9(A) and FIG. 9(B) are plan views illustrating the magnet 55 and the second holding portion 56 according to the present embodiment. In the present embodiment, the magnet 55 is annular. Inside the magnet 55, a cone portion 80 is provided. The cone portion 80 is conical. The cone portion 80 may be pyramidal.

The cone portion 80 is non-magnetic material. As the material of the cone portion 80, a synthetic resin such as polyacetal (POM) may be used. Alternatively, the cone portion 80 may be colored non-magnetic metal such as aluminum or stainless steel.

Similarly to the above embodiment, foreign objects mixed in oil are attracted to an attracting face H1 of the magnet 55. If the amount of the foreign objects attracted on the attracting face H1 is small, a dimension W indicating the amount of the foreign objects deposited in the extension direction of an optical axis AX is small. As the amount of the foreign objects attracted on the attracting face H1 increases, the dimension W of the foreign objects in the extension direction of the optical axis AX becomes high.

If foreign objects are attracted on the attracting face H1 of the magnet 55 and the dimension W becomes large, the surface of the cone portion 80 is gradually covered with the foreign objects. As the dimension W becomes high, the area of the surface of the cone portion 80 that is not covered with the foreign objects gradually becomes small. According to the increase in the amount of the foreign objects, the area of the surface of the cone portion 80 that is not covered with foreign objects changes. Based on the dimension W of the foreign objects in the extension direction of the optical axis AX, a dimension D of the surface of the cone portion 80 in the plane orthogonal to the optical axis AX changes.

A photographing unit 51 photographs the surface of the cone portion 80. The dimension D is calculated based on the image data acquired by the photographing unit 51. As illustrated in FIG. 9(A), it is determined that the amount (dimension W) of the foreign objects collected on the attracting face H1 is smaller as the dimension D is larger. As illustrated in FIG. 9(B), it is determined that the amount (dimension W) of the foreign objects collected on the attracting face H1 is larger as the dimension D is smaller.

As described above, the cone portion 80 is provided inside the annular magnet 55 in the present embodiment. By calculating the dimension D based on the image data, the amount of the foreign objects collected on the magnet 55 is estimated. The photographing unit 51 and the magnet 55 are arranged in the extension direction of the optical axis AX. Thus, it can be difficult to recognize, from the image data, the dimension W of the foreign objects deposited on the attracting face H1. In the present embodiment, the cone portion 80 is provided inside the annular magnet 55, and the dimension D of the area of the surface of the cone portion 80 that is not covered with the foreign objects is calculated. The dimension D is a dimension in the plane orthogonal to the optical axis AX. Thus, it is easy to recognize the dimension D from the image data.

Other Embodiments

In the above embodiments, the optical axis AX and the center of the magnet 55 are aligned with each other. The optical axis AX and the center of the magnet 55 may be misaligned.

In the above embodiments, the axle device 1 is described as an example of a mechanical device including a mechanical part that is oil-immersed in an internal space of a housing. The mechanical device may be a transmission device. The transmission device is also a mechanical device including a mechanical part that is oil-immersed in an internal space of a housing. According to the above embodiments, the deterioration state of the mechanical part of the transmission device can also be estimated.

REFERENCE SIGNS LIST

1 AXLE DEVICE (MECHANICAL DEVICE)
2 AXLE HOUSING
2H INTERNAL SPACE
20 OPENING
50 DETECTION DEVICE
51 PHOTOGRAPHING UNIT
51A OPTICAL SYSTEM
51B IMAGING DEVICE
51C CAMERA HOUSING
52 ILLUMINATION UNIT
53 SPACER PORTION
54 FIRST HOLDING PORTION
55 MAGNET
56 SECOND HOLDING PORTION
57 CONNECTION PORTION
58 OPENING PORTION
60 FLOW SPACE
61 SEALING MEMBER
62 FIXING RING
70 INDICATOR PORTION
80 CONE PORTION

100 DUMP TRUCK (WORK VEHICLE)
110 VEHICLE-BODY FRAME
120 DUMP BODY
130 TRAVELING DEVICE
140 TIRE
150 WHEEL
150R REAR WHEEL
160 SUSPENSION DEVICE
AX OPTICAL AXIS
F1 FRONT END FACE
F2 LENS-SIDE END FACE
F3 MAGNET-SIDE END FACE
H1 ATTRACTING FACE
H2 REAR FACE
RX ROTATION AXIS

The invention claimed is:

1. A detection device comprising:
an attracting face photographing unit;
a first holding portion holding the attracting face photographing unit;
a magnet having an attracting face facing a flow space in which fluid flows, the attracting face opposed to the attracting face photographing unit via the flow space;
a second holding portion holding the magnet; and
a connection portion connected to the second holding portion and having an opening portion.

2. The detection device according to claim 1, further comprising:
a spacer portion which is arranged between the photographing unit and the magnet and has a magnet-side end face opposed to the attracting face via the flow space and is held by the first holding portion.

3. The detection device according to claim 1, wherein
in a plane orthogonal to an optical axis of an optical system of the photographing unit, the optical axis and a center of the attracting face are aligned with each other.

4. The detection device according to claim 1, further comprising:
an indicator portion provided near the magnet and used to determine a state of a liquid flowing in the flow space.

5. The detection device according to claim 1, wherein
the magnet is annular and includes a cone portion arranged inside the magnet.

6. The detection device according to claim 1, wherein
the first holding portion is arranged in an opening of a housing accommodating a mechanical part.

7. A mechanical device comprising:
a housing having an opening in which the detection device according to claim 1 is arranged; and
a mechanical part accommodated and oil-immersed in the housing.

8. A work vehicle comprising:
the mechanical device according to claim 7.

9. A detection device comprising:
a photographing unit;
a first holding portion holding the photographing unit;
a magnet having an attracting face facing a flow space in which fluid flows, the attracting face opposed to the photographing unit via the flow space;
a second holding portion holding the magnet;
a connection portion connected to the second holding portion and having an opening portion; and
a spacer portion which is arranged between the photographing unit and the magnet and has a magnet-side end face opposed to the attracting face via the flow space and is held by the first holding portion.

10. A detection device comprising:
a photographing unit;
a first holding portion holding the photographing unit;
a magnet having an attracting face facing a flow space in which fluid flows, the attracting face opposed to the photographing unit via the flow space;
a second holding portion holding the magnet;
a connection portion connected to the second holding portion and having an opening portion; and
an indicator portion provided near the magnet and used to determine a state of a liquid flowing in the flow space.

* * * * *